US005659685A

United States Patent [19]

Williams et al.

[11] Patent Number: 5,659,685

[45] Date of Patent: Aug. 19, 1997

[54] METHOD AND APPARATUS FOR MAINTAINING NETWORK COMMUNICATIONS ON A COMPUTER CAPABLE OF CONNECTING TO A WAN AND LAN

[75] Inventors: Robert J. Williams; Evan J. Schrier, both of Kirkland; Andrew L. Nicholson, Duvall, all of Wash.

[73] Assignee: Microsoft Corporation, Redmond, Wash.

[21] Appl. No.: 355,081

[22] Filed: Dec. 13, 1994

[51] Int. Cl.$^6$ .............. G06F 13/14; G06F 13/42; H04J 3/24; H04L 12/46
[52] U.S. Cl. .................. 395/200.5; 395/200.79; 370/401; 364/940.62; 364/940.68; 364/DIG. 2
[58] Field of Search ............ 395/200.02, 200.06, 395/200.1, 200.12, 200.15, 284, 311; 370/85.13, 85.14; 364/514 C, 940.62, 940.64, 940.68

[56] References Cited

U.S. PATENT DOCUMENTS

| 4,922,503 | 5/1990 | Leone | 370/85.13 |
| 4,933,937 | 6/1990 | Konishi | 370/85.13 |
| 5,179,554 | 1/1993 | Lomicka et al. | 370/85.13 |
| 5,214,646 | 5/1993 | Yacoby | 370/85.14 |
| 5,222,064 | 6/1993 | Sagawa | 370/85.13 |
| 5,241,682 | 8/1993 | Bryant et al. | 395/200.06 |
| 5,568,613 | 10/1996 | Futral | 395/200.02 |
| 5,583,997 | 12/1996 | Hart | 395/200.15 |

OTHER PUBLICATIONS

Allen, M.;"Novell IPX Over Various WAN Media (IPX-WAN)"; Internet RFC–1634 May 1994.
Baker, F., Bowen R.;"PPP Bridging Control Protocol (BCP)"; Internet RFC–1638 Jun. 1994.

*Primary Examiner*—Larry D. Donaghue
*Assistant Examiner*—Mark H. Rinehart
*Attorney, Agent, or Firm*—Leydig, Voit & Mayer, Ltd.

[57] ABSTRACT

A method and apparatus are described for dynamically re-configuring bound adaptors on a networked computer capable of connecting to a plurality of networks via a plurality of adaptors including a WAN adaptor and a LAN adaptor. When a WAN link is activated by an incoming call, the networked computer is configured to be a router of packets between the WAN and LAN adaptors. When a WAN link is activated by an outgoing call, the networked computer logically disconnects from all adaptors except the activated WAN adaptor.

12 Claims, 6 Drawing Sheets

METHOD AND APPARATUS FOR MAINTAINING NETWORK COMMUNICATIONS ON A COMPUTER CAPABLE OF CONNECTING TO A WAN AND LAN

AREA OF THE INVENTION

The present invention relates generally to networked computer systems, and more particularly, to networked computer systems attached to a plurality of networks such that messages are passed from a computer on a first network to a computer on a second network, and vice versa.

BACKGROUND OF THE INVENTION

Known network operating facilities for personal computers and network servers support simultaneous connections (i.e. logical conversations) to other computers and computer networks via a plurality of adaptors. The ability to support a plurality of connections to various networks via the plurality of adaptors facilitates the maintenance of a direct connection to a local area network (LAN) and a wide area network (WAN). This ability of a networked computer to support a plurality of connections to a heterogenous set of networks presents the opportunity for the networked computer to route messages received on a WAN adaptor to a computer network linked to the networked computer via a LAN adaptor.

In prior known computer systems, a networked computer is statically connected to both a LAN and a WAN, the networked computer routes messages from a connected WAN to another computer on a connected LAN. The networked computer receives a network request via the WAN connection designating the LAN address and a destination network connected to the networked computer via a LAN adaptor. The networked computer creates a protocol header for the received network request in a known manner and forwards the network request on the LAN to the destination computer.

It is also known for a networked computer to act as a client of a WAN link. The networked computer acting as a client may send requests to a destination network connected via the WAN link. These requests may come from the networked computer or from other computers connected to a same LAN as the networked computer. The networked computer sends a network request to a remote computer network via the WAN connection. The remote request is received by the remote computer network and routed, if necessary to a destination network connected to the remote computer network. The routing of the network message to a computer on the remote network is accomplished by creating a protocol header for the received network request and then forwarding the network message to the specified destination network via the WAN link.

When a networked computer sends a packet under the known Inter-network Packet Exchange (IPX) protocol or other network transport protocols, packet headers contain a destination network number identifying a network to which a destination for the packet belongs. Under the IPX protocol, if the destination is on the same network as the sending computer, then a zero may be placed in the destination network field of the packet header.

If, however, the destination is located on another (remote) network, then the sending computer transmits a routing information protocol (RIP) request on the network to which the sending computer is directly connected (i.e., the "zero" network). The zero network RIP request is responded to by the routers on the sending computer's network which have a path to the destination network. The ability of computers to maintain paths to connected networks presents the possibility of maintaining an open-ended network to which additional networks may be connected via routing computers.

The ability of a networked computer to connect to an open ended set of networks under the IPX protocol is not without its drawbacks and/or limitations. First, IPX Network identifications are not globally administered, and thus do not guarantee that two distinct networks will have different network identifications. Therefore, it is possible for two connected networks to have a same network identification value because the network identification values typically fall within a very small set of values. As a consequence, more than one response to a RIP request may be received from routers connected to distinct networks having the same network identification.

A known manner for preventing two networks from having a same identification is to have a single administrator of network identification values which centrally governs the allocation of identification values to the connected networks and guarantees that the network numbers associated with each of the connected networks are non-overlapping. This solution is not a practical solution in an open-ended network connection environment where a networked computer may establish a connection to any of a number of remote networks via a WAN connection. In such cases, central administration of network numbers is simply not a practical solution since there is no guarantee that the connected network will allow the central administrator to allocate a network value to the network.

Second, if a sending computer connected to more than one network is asked to send a network zero request, then a question arises with respect to which network, of a plurality of connected networks, the packet is to be sent. One previously known solution is to send the request on all adaptors (connecting the sending computer to each of the networks). However, this assumes that there is no duplication of destination network identifications. This however, is not a valid assumption for non-centrally administered interconnected networks.

The ability of a networked personal computer to bind a WAN Adaptor and a LAN Adaptor clearly enhances the spectrum of possible uses for the networked computer. These uses include configuring the networked computer as a router for transferring packets between networks connected to the networked personal computer via LAN and WAN adaptors. However, the benefits of attaching a personal computer to other networks via a WAN adaptor and a LAN adaptor must be weighed against the uncertainty of whether all of the connected networks will be uniquely identified and the costs of solutions which ensure that all logically connected networks are uniquely identifiable.

SUMMARY OF THE INVENTION

It is a general object of the present invention to enable a computer to distinctly identify various other connected networks in an environment that does not include a central network number administrator.

Another object of the present invention is to more clearly define the behavior of a networked computer in accordance with the state of the computer's connectivity to other networks via a set of adaptors.

Yet another object of the present invention is to enable a computer capable of binding both LAN and WAN adaptors to dynamically respond to changes in the set of bound adaptors.

It is a more specific object of the present invention to enable a computer capable of binding both LAN and WAN adaptors to dynamically adjust its connectivity and network capabilities in response to a detected change in the up/down status of an associated WAN link.

In view of the above objects, a computer system and method are described which facilitate the reconfiguration of the computer system in response to changes in a set of bound adaptors. When a WAN link goes up, an initial determination is made whether the up signal resulted from dialing in or out from the computer. If the up signal arose from a second computer dialing in to the computer, then the computer dynamically re-configures to become a router of packets between all bound adaptors. If, however, the computer dialed out via a WAN adaptor to a second computer, then the computer is logically disconnected from all other bound adaptors.

As a result of the above described dynamic reconfiguration steps, the computer is able to distinctly identify various other connected networks in an environment that does not include a central network number manager.

In order to limit the consumption of computer resources that are not likely to be utilized, the computer system of the present invention only maintains RIP tables when it is likely that they will be used in the near future. Thus, in response to the binding of a second adaptor, the computer commences the acquisition of RIP information associated with connected networks. If the number of bound adaptors later reduces to a single adaptor, then the computer halts the acquisition of routing information.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE ILLUSTRATIVE EMBODIMENT

Figure 1:
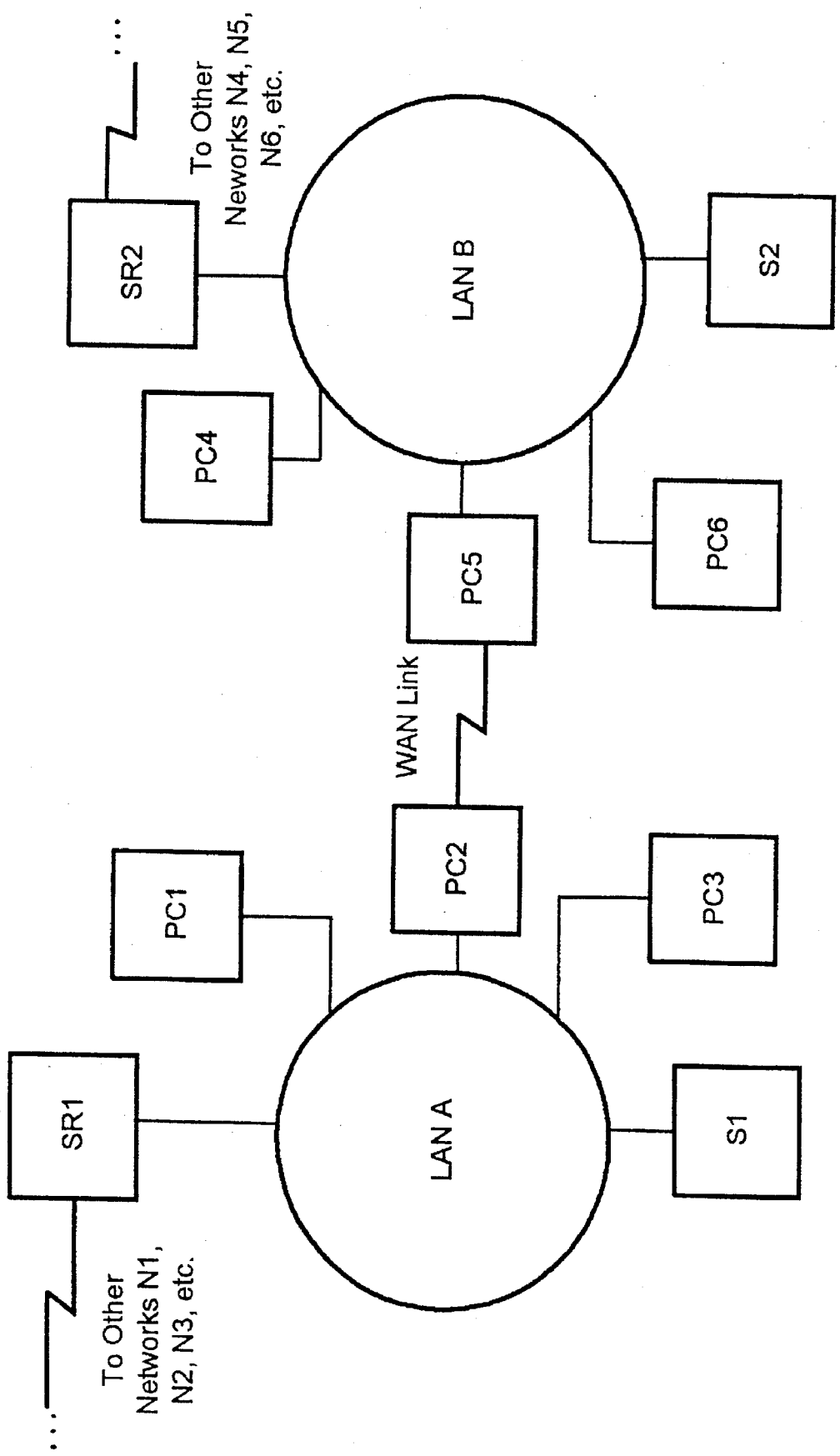
FIG. 1 is a schematic diagram of a plurality of connected networks for practicing the present invention.

The utility of the present invention is most evident in complex network environments wherein LANs connected via a WAN link comprise a plurality of client computers and static routers coupling the LANs to additional networks. Turning now to FIG. 1, an exemplary network environment is illustrated in which a computer embodying the present invention is desirably incorporated. In a network environment incorporating the present invention, a computer PC2, directly coupled to a LAN A, connects to a LAN B via a WAN link to a computer PC5. The computer PC5 is coupled directly to the LAN B via a LAN adaptor.

The computers PC1, PC2, PC3, PC4, PC5 and PC6 are personal computers including, for example, INTEL 386, 486 or PENTIUM processors. It is also noted that while a modem in most instances is the transmitter and receiver of messages on the WAN link, other types of suitable WAN transmitter/receiver components will be known to those skilled in the art of computer network architecture.

The computers PC2 and PC5, each having a WAN adaptor of known type, possess the ability to establish connections to a large number of other networks via the WAN adaptors. Therefore, in accordance with the present invention, the computers PC2 and PC5 include a set of communication protocols which enable the computers PC2 and PC5 to ensure that two connected networks having a same network number do not present a problem when the computers PC2 and PC5 route messages from other networks connected via the WAN or when submitting requests to the other networks via the WAN. It is noted that while a computer PC5 is connected to the computer PC2 in the illustrative example in FIG. 1, in alternative embodiments the computer PC5 is replaced by any of several known suitable network devices having WAN routing capabilities. Suitable alternatives include servers and static routers.

In addition to the computer PC2, the LAN A comprises a network server S1 which provides network resources in a known manner to the personal computers PC1, PC2 and PC3 connected to the LAN A. The LAN A also comprises a static router SR1. The static router SR1 provides a means for routing, in a known manner, packets between LAN A and other networks N1, N2, N3, and etc.

The LAN B, in accordance with an illustrative embodiment of the present invention, contains components similar to those described above in connection with the description of the computer hardware components connected to the LAN A. The LAN B comprises a network server S2. The network server S2 provides shared network resources in a known manner to the personal computers PC4, PC5 and PC6 directly connected to the LAN B. The LAN B also comprises a static router SR2 which routes packets between LAN B and other networks N4, N5, N6, and etc.

The set of networks to which the LAN B or the LAN A is connected may change over time as network connections via the WAN adaptors are created and dropped, and the computer networks linked via the adaptors of the static routers SR1 and SR2 are modified by installing new adaptors and linking the new adaptors to other networks.

The interconnected network environment depicted in FIG. 1 is merely illustrative. Modifications to the illustrative network falling within the scope of the appended claims would be known to those of skilled in the area of networked computer systems. Therefore the present invention is not be limited to the network configuration illustratively depicted in FIG. 1, but rather includes all modifications falling within the invention defined by the appended claims.

As previously noted in the background of the invention, under the IPX protocol and other known transport layer protocols used in multi-networked network connection schemes, a network is identified by a network identification value provided by a network server for the network. Furthermore, in order for the IPX protocol to operate correctly, all network numbers must be mutually exclusive (i.e. no network numbers overlap). Therefore, the network numbers must be administered in a way such that two connected IPX LANs have mutually exclusive sets of network numbers. The network servers S1 and S2 provide a first network value for the LAN A and a second network value for the LAN B respectively. Furthermore, the task of assigning a network identification value to a network is handled in a de-centralized manner, and thus there is no central network administrator which assigns network numbers to various networks as they are introduced into the domain of connected computer networks illustrated in FIG. 1. There is no guarantee that the first network value, the second network value, and the network numbers for other connected networks are all distinct. Therefore, in accordance with the illustrative embodiment of the present invention, logical connections to networks are limited and dynamically specified in order to provide access to a plurality of networks, yet ensure that at any given time each network connected to a personal computer having a plurality of network adaptors, such as computer PC2, is associated with a distinct network identification value.

Before describing the communication architecture for a personal computer embodying the present invention, it is noted that the various network components will be described with respect to the OSI model for communication architecture. As is known in the art, the highest level comprises the Application layer, followed by the Presentation layer, the Session layer, the Transport layer, the Network layer, the Data Link layer, and finally the Physical layer. It is also noted that the network components depicted in FIG. 2 do not correspond to the OSI layers. Instead, the components cross the boundaries and into additional layers of the OSI model. The layers are therefore referred to in order to provide an idea of the relative position, and thus responsibilities, of a particular network component of the personal computer.

Figure 2:
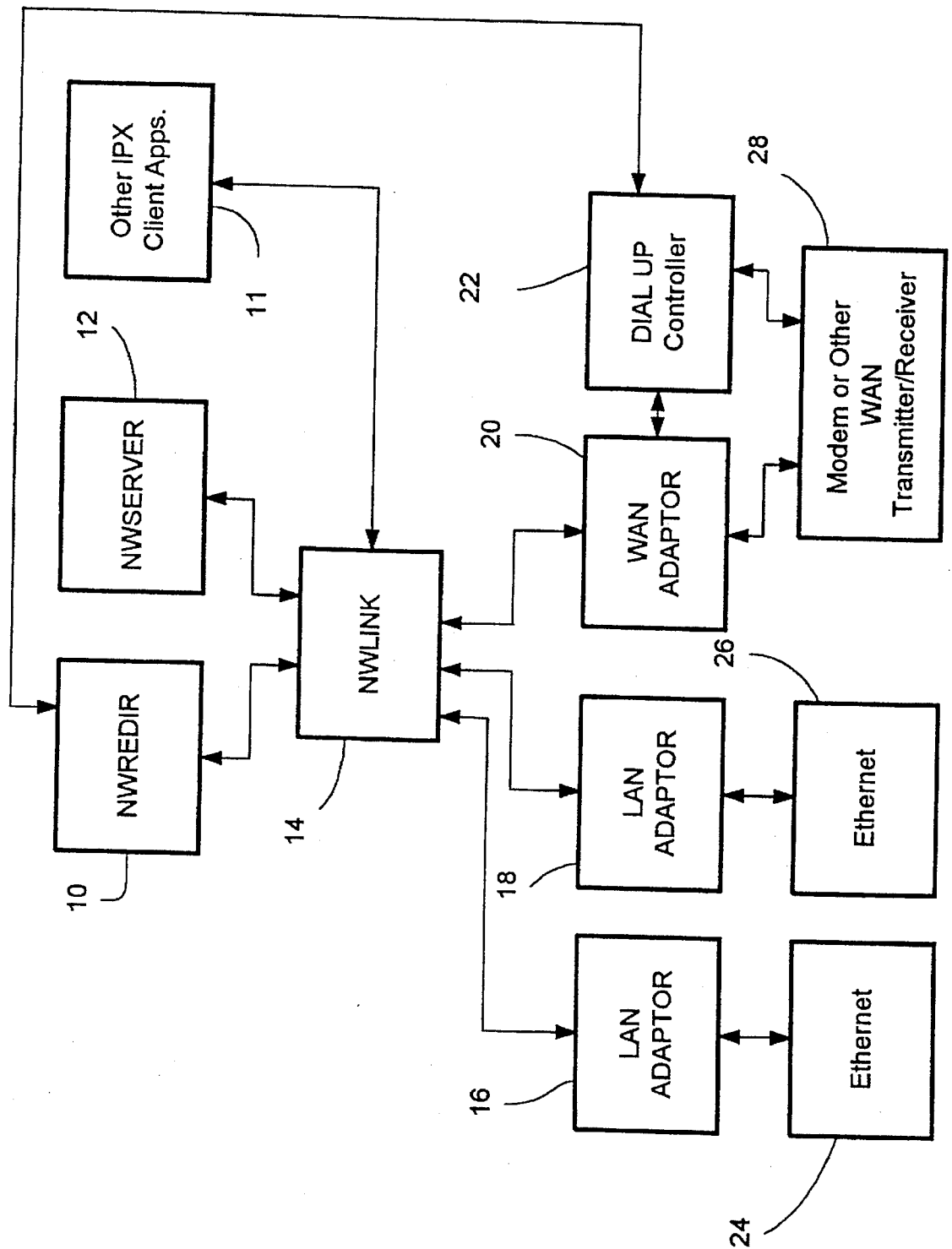
FIG. 2 is a schematic depiction of the communications architecture for an illustrative networked computer embodying the present invention.

Turning now to FIG. 2 a schematic drawing is provided of the communications architecture of the computer PC2 embodying the present invention. It will be appreciated by those skilled in the art that the lines between the illustrated communication components in FIG. 2 may represent logical and/or physical connections between the schematically illustrated network communication components. The present invention concerns the Session layer and the layers below the Session layer. Specific Applications layer and Presentation Layer components are merely design choices which are determined by individual application program developers. Therefore no description is provided of Applications layer and Presentation layer components.

Starting at the Session layer of the OSI model, the computer PC2 includes a NWREDIR 10 and NWSERVER 12. The NWREDIR 10 and NWSERVER 12 are session layer IPX client applications. The NWREDIR 10 and NWSERVER 12 receive network requests from higher level processes and direct them onto the network via NWLINK 14 (discussed below). The NWREDIR 10 and NWSERVER 12 also receive messages from other networked computers via NWLINK 14 and forward the messages to an identified higher level processes on the computer PC2. NWREDIR 10 and NWSERVER 12 are only two examples of IPX client applications. Other IPX client applications 11 will be known to those skilled in the art.

NWREDIR 10 and NWSERVER 12 are persistent system-level network components, and are present when the computer PC2 changes its configuration in accordance with the present invention. NWREDIR 10 and NWSERVER 12 maintain state information relating to currently established connections On a network. The NWREDIR 10 and NWSERVER 12 are operating system components, and a user cannot directly access the NWREDIR 10 and NWSERVER 12 to inform them when the configuration of the PC2 changes. Therefore, dial-up controller 22 instructs the NWREDIR 10 to clear the connection tables before switching networks. Also, the dial-up controller 22 the user to close any open files on the LAN before switching to the WAN or vice versa in accordance with the present invention. In addition, NWLINK 14 informs operating system components on the computer PC2 that a network number has changed in accordance with yet another aspect of the illustrative embodiment of the present invention.

Non-persistent applications may also maintain network state information. These applications may have to be shut down and then restarted when the computer PC2 switches networks in response to a WAN link coming up. It is the responsibility of the user to perform the restarting operation since, in contrast to operating system software, it is the user's responsibility to start non-operating system applications.

NWLINK 14 implements the IPX transport layer protocol in the networked computer PC2. NWLINK 14 converts data from IPX client applications such as NWREDIR 10 and NWSERVER 12 to IPX packets. The IPX packets are then routed to proper network adaptors in accordance with an identified destination computer and routing data for connected networks maintained by NWLINK 14 of the networked computer PC2. NWLINK 14 receives IPX packets from the adaptors, removes the data embedded within the IPX packets, and transfers the data to IPX client applications such as NWREDIR 10 and NWSERVER 12.

The NWLINK 14 in addition to passing data to IPX client applications is also capable of routing an IPX packet received from a WAN adaptor 20 to a LAN adaptor such as a LAN Adaptor 16 or a LAN Adaptor 18, and from one of the LAN Adaptors 16 or 18 to the WAN adaptor 20 in a manner known to those of ordinary skill in the art. In addition, if the LAN Adaptors 16 and 18 are logically connected to the same network having a central authority which manages all of the network IDs associated with the LAN Adaptors 16 and 18, then the NWLINK 14 is also capable of routing between the LAN Adaptors 16 and 18. However, as will be explained further below, the NWLINK 14 does not route between the LAN Adaptors 16 and 18 when the WAN link provided by the WAN Adaptor 20 is down.

The LAN Adaptor 16, LAN Adaptor 18 and WAN Adaptor 20 comprise the Network and Data Link layers of the communication architecture for the networked computer PC2. In the illustrative embodiment of the present invention, the LAN Adaptors 16 and 18 are connected to the same LAN (LAN A). The adaptors 16, 18, and 20 operate in concert with the NWLINK 14 to send and receive the data bits comprising the complete data packets to physical layer communication devices which pass actual bits of data to transmission media. The WAN adaptor 20 is equipped with a dial up controller 22 (described below) that informs the NWLINK 14 when the associated link is up or down, and to specify whether the PC2 is responsible for bringing the link up (when NWLINK 14 is informed of an up link). The interface between the adaptors 16, 18, and 20 and the NWLINK 14 transport level network component conforms to the network driver interface specification (NDIS) 3.1.

The process wherein NWLINK 14 operatively connects to the adaptors 16, 18, and 20 via the NDIS interface is referred to as "binding." During binding, the NWLINK 14 creates a table entry corresponding to the bound adaptor. The table entry provides a pointer to the bound adaptor and other known information enabling the NWLINK 14 to send messages to the adaptor and receive messages from the adaptor.

In the illustrative embodiment of the present invention, the preliminary steps of loading a network driver and initiating binding occur automatically when an adaptor is physically installed on the computer PC2 in accordance with a "plug and play" system. The components and operation of a plug and play system are summarized in chapter 8 of *Windows 95*, by Adrian King, Microsoft Press 1994 (ISBN 1-55615-626-X), the teachings of which are incorporated by reference. In other systems, a user manually instructs the operating system to load a driver and commence the binding process.

Network drivers may be loaded or unloaded at any time in response to hardware events such as the insertion or removal of a PCMCIA card. A network driver is loaded either because a user has manually installed the driver or because the operating system, in a computer having a plug and play system, has detected the presence of a network adaptor. The operating system informs NWLINK 14 whenever a network driver is loaded or unloaded. Next, NWLINK 14 goes through the binding phase and calls the driver that NDIS loaded and tells it to open, binds to the driver in a known manner, and then makes decisions in accordance with FIGS. 4 and 5 described below.

The plug and play system automatically loads a driver corresponding to an adaptor and informs NWLINK 14 that the adaptor is present when the adaptor is plugged into the computer PC2. If the adaptor is later unplugged from the computer PC2, then the change to the set of connected adaptors is automatically updated. Alternatively, the binding of an adaptor is performed manually in accordance with requirements specified by the network adaptor and the PC2. The manner in which the adaptor is bound is merely a design consideration in which the ease of programming is weighed against the ease of binding an adaptor by a user (at the expense of more complex binding software and/or firmware in both the adaptors and NWLINK 14.

Linking of the WAN Adaptor 20 to outside lines is controlled by a dial up controller 22. In general, the dial up controller 22 is responsible for connecting and disconnecting the WAN adaptor 20 to another network via a modem 28. When a link is established to another modem, the dial up controller 22 informs the WAN adaptor 20, and the link is brought up.

In summary, the dial up controller 22 performs the following functions. The dial up controller 22 is responsible for issuing commands to a modem 28 for dialing up another machine. The dial up controller 22 is also responsible for answering a call received by the modem 28.

Furthermore, the dial up controller 22 negotiates any information required to communicate under a network protocol. For example, in order to establish an IPX link, the network number to be used for the WAN segment must be negotiated. Finally, the dial up controller 22 monitors an established link and informs the WAN adaptor 20 when the line is dropped.

At the physical layer of the OSI description of a computer embodying the present invention, ethernet connectors 24 and 26 connect the LAN adaptors 16 and 18 to a coaxial cable. The LAN connectors may also be any of a number of known connectors such as, for example token ring, arcnet, and FDDI connectors. The modem 28 or other WAN transmitter/receiver connects the WAN Adaptor 20 to a phone line or other suitable physical transmission media.

Having described the general hardware and communications components of an illustrative computer network and personal computer incorporating the present invention, attention is now directed to the steps implemented by the communication components schematically depicted in FIG. 2 in order to carry out selective, dynamic connection to networks in a personal computer having a plurality of adaptors for connecting to a plurality of networks. However, before describing these steps, data structures contained in the NWLINK 14 which facilitate the execution of the procedures below are briefly described in conjunction with FIG. 3.

Figure 3:
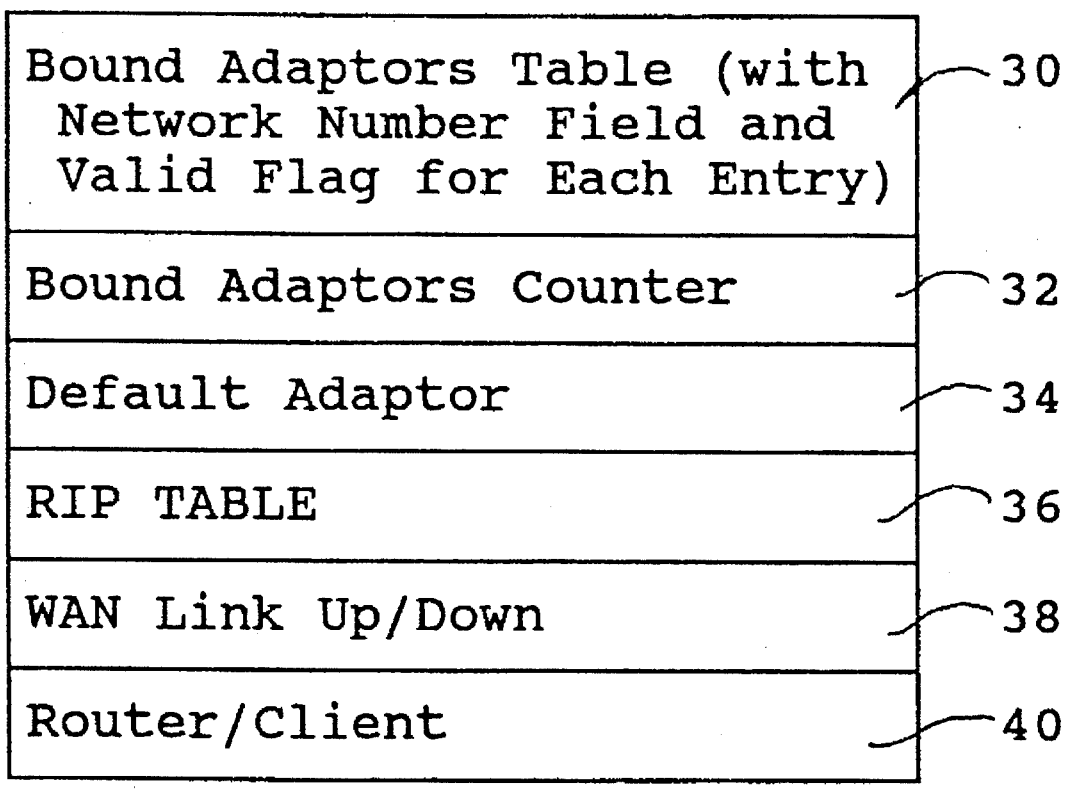
FIG. 3 is a schematic drawing of the general data structures within the NWLINK component for carrying out the present invention.

Turning now to FIG. 3, the NWLINK 14 includes a Bound Adaptors Table 30. The Bound Adaptors Table 30 is an extensible array whose entries correspond to each of the adaptors bound to the computer PC2. Each entry comprises known information enabling a bound LAN or WAN adaptor to communicate with the NWLINK 14. The information within each entry includes a network number field for storing a network number for a bound adaptor and a Valid flag for indicating whether an adaptor stored at the particular position in the Bound Adaptors Table is logically connected to NWLINK 14. A Bound Adaptors Counter 32 contains the number of adaptors currently bound to the NWLINK 14.

As previously explained, a zero network address in the IPX protocol indicates that the destination for a packet is on a same network as the sending computer. This creates a problem when a computer comprises a plurality of adaptors connected to a plurality of networks. Therefore, in the illustrative embodiment of the present invention the NWLINK 14 specifies a default adaptor to which packets having a destination network address of zero are sent. A Default Adaptor variable 34 in the NWLINK 14 identifies the default adaptor. In the illustrative embodiment of the present invention, the Default Adaptor variable 34 stores an index for referencing an entry of the Bound Adaptors Table 30 containing the data for the default adaptor. A wide variety of other ways to identify the default adaptor will be known to those skilled in the art. The steps for selecting the default adaptor referenced by the Default Adaptor variable 34 are described below.

The NWLINK also includes a RIP TABLE 36 of well known composition. The RIP TABLE contains IPX routing information for forwarding of packets by the adaptors to other connected network entities. A WAN Line Up/Down field 38 indicates the current state of a bound WAN adaptor 20. When the WAN Link Up/Down field 38 indicates that the WAN link is up, the computer PC2 may be configured as either a router of packets from a remote network via the WAN adaptor 20, or as a WAN client wherein the computer PC2 is logically disconnected from the LAN A. A Router/Client field 40 indicates whether the PC2 is configured as a client or router while a link to another computer via the WAN adaptor 20 is up.

In addition, the NWLINK 14 provides a set of interface commands for the WAN adaptor 20 which are used to define the routing behavior of the NWLINK 14 of the computer PC2. An "Enable Routing" command, instructs the NWLINK 14 to begin routing packets received by the WAN adaptor 20 to one or more of the bound LAN adaptors. The Router/Client variable 40 is set to the "router" state in response to the Enable Routing command. A "Get Net ID (client)" command causes NWLINK 14 to return a network ID currently assigned to the WAN adaptor. The default value of this adaptor is zero. A "Set Net ID" command assigns a new net ID to a WAN adaptor 20.

A "Get Net ID (router)" command causes NWLINK 14 to obtain a network ID that is believed to be distinct from any of the network ID's known on the LAN A to which the computer PC2 is attached (including all of the networks connected to the LAN A via the static router SR1). The net ID obtained by the Get Net ID (router) command is assigned to the WAN adaptor 20 by the Set Net ID command.

Computers are increasingly capable of binding and unbinding network adaptors with minimal user intervention. Furthermore, the changes to the number of adaptors bound to a computer may have a considerable effect upon the capabilities and role of the computer in the network(s) to which the computer is linked. In the illustrative embodiment of the present invention, the computer PC2 detects changes to the set of network adaptors bound to the computer PC2. In appropriate circumstances the computer PC2 modifies its networking behavior in response to the detected changes. The networking behavior changes of the computer PC2 in response to a change in the number of bound adaptors are summarized in FIG. 4.

Figure 4:
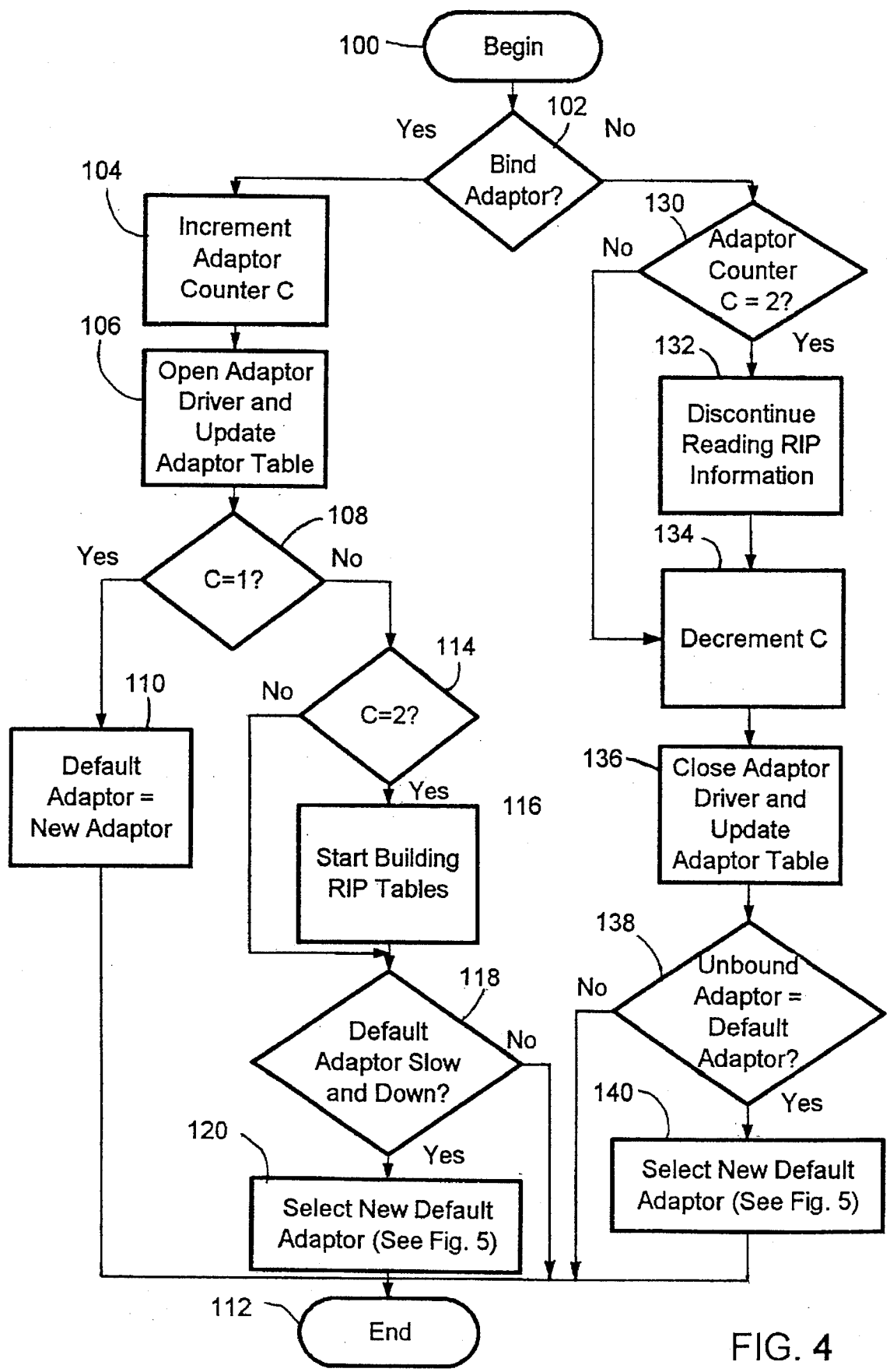
FIG. 4 is a flowchart summarizing the steps for reconfiguring a networked computer when an adaptor is bound or unbound on the networked computer.

Turning to FIG. 4, control passes to step 102 from the Begin step 100 when the operating system informs NWLINK 14 of a change to the set of network adaptors. The initiation of the binding or unbinding of a network driver by the operating system may occur in response to a hardware event such as the insertion or removal of a PCMCIA card, or in response to a command issued by a user to the operating system requesting an adaptor that is already physically inserted on the computer PC2 to be bound or unbound. The adaptor may be a LAN Adaptor such as LAN Adaptors 16 and 18, or the adaptor may be a WAN Adaptor such as WAN Adaptor 20.

If at step 102, the operating system indicates to NWLINK 14 that a new adaptor is to be bound, then the operating system loads a new network driver corresponding to the new adaptor. Control passes to step 104 wherein NWLINK 14 increments the value stored in the Bound Adaptors Counter field 32 in order to account for the binding of the new adaptor to the computer PC2. Control then passes to step 106.

At step 106, NWLINK 14 opens the new network driver associated with the new adaptor (loaded previously by the operating system) using the NDIS 3.1 interface. Furthermore, at step 106, the Bound Adaptors Table 30 is updated by adding data corresponding to the new network adaptor to an open entry in the Bound Adaptors Table 30. The well known information contained within the Bound Adaptors Table 30 entry enables the NWLINK 14 to transmit and receive packets of data via the new adaptor. When an adaptor entry is removed from the Bound Adaptors Table 30, the gap in the table (if one exists) if filled by an adaptor entry stored at the end of the table 30. Control then passes to step 108.

A computer, such as computer PC2, must be connected to at least two (2) adaptors in order to route packets between the networks or computers associated with the at least two (2) adaptors. In accordance with one aspect of the illustrated embodiment of the present invention, the computer PC2 is not configured as a router unless there are at least two bound adaptors. Therefore if at step 108 the value stored in the Bound Adaptors Counter 32 equals one (1), then control passes to step 110 wherein the default adaptor is set equal to the new adaptor. Control then passes to an End step 112.

If however, at step 108, the value stored in the Bound Adaptors Counter 32 is greater than 1, then the computer PC2 is connected to at least two networks (and capable of routing packets between the at least two networks), and control passes to step 114. At step 114, if the value stored in the Bound Adaptors Counter 32 equals two (2), then the computer PC2 has become capable of routing for the first time as a result of the binding of a new adaptor to the computer PC2. As will be explained below, there is no guarantee that the computer PC2 will become a routing station between networks. However, since it takes a certain amount of time for the computer PC2 to become aware of the various networks to which packets may be routed by the computer PC2, control passes to step 116 wherein the NWLINK 14 begins building the RIP table 36 in a known manner.

It is noted that the computer PC2 does not become a router at step 116, it merely acquires the data that will enable it to perform the task of routing when the computer PC2 does become a router in response to the WAN adaptor going up in response to a remote request by, for instance, a user on the computer PC5 dialing in to the computer PC2. Therefore, after enabling the RIP Table building process, control passes to step 118. If the value stored in the Bound Adaptors counter 32 is three or more, then control passes directly from step 114 to 118 since the routing process was already commenced when the NWLINK 14 detected a second bound adaptor.

Figure 5:
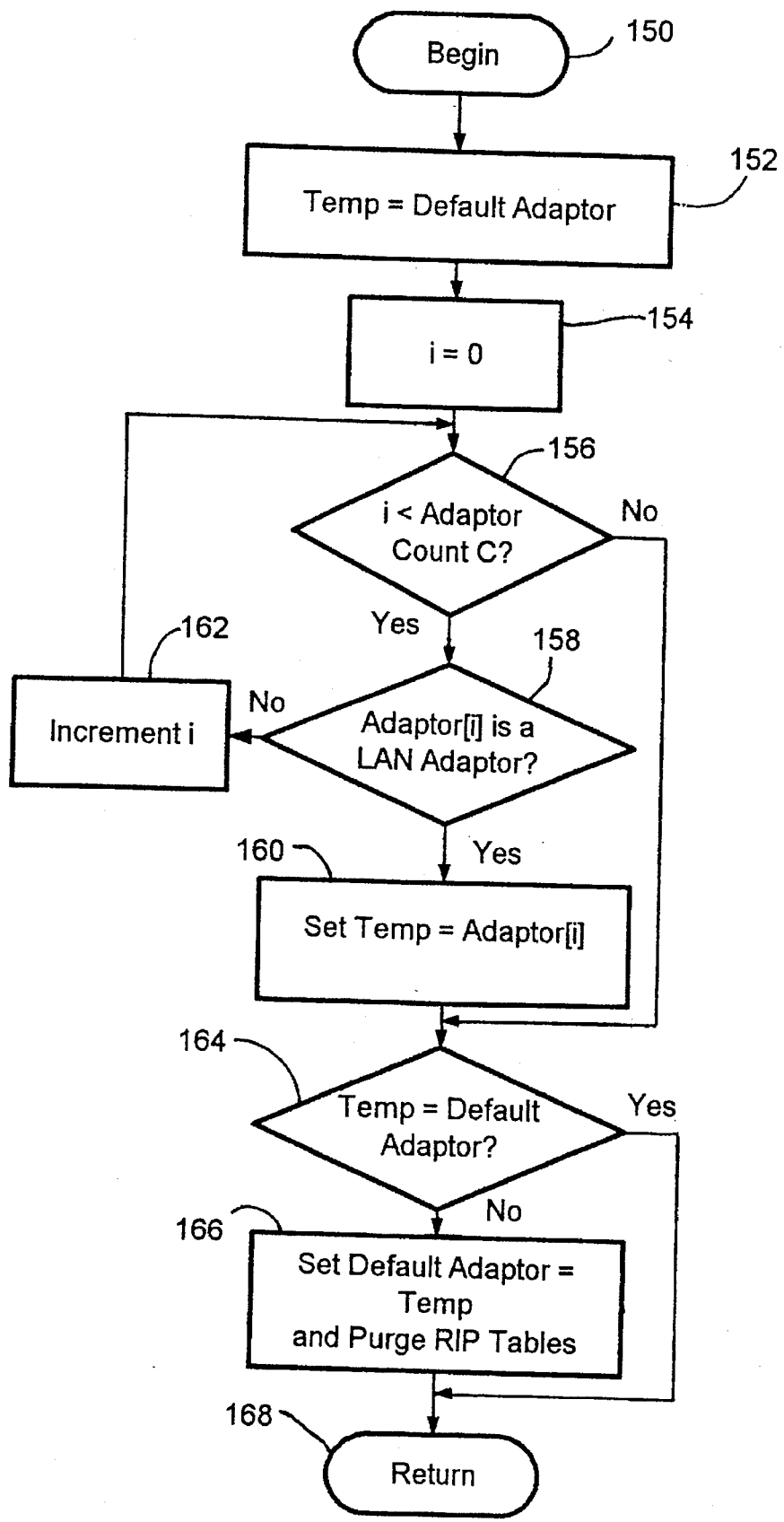
FIG. 5 is a flowchart summarizing the steps for selecting a default network adaptor in a networked computer capable of supporting a plurality of adaptors including both WAN and LAN adaptors.

At step 118, if the default adaptor referenced by the Default Adaptor variable 34 is slow and down (i.e. is a down WAN adaptor), then control passes to step 120 wherein the steps are performed for selecting a new default adaptor. The steps for selecting a default adaptor, summarized in FIG. 5, are described in further detail below. After a new default adaptor is selected during step 120, control passes to the End step 112. If however, at step 118, the current default adaptor (identified by the Default Adaptor variable 34) is not slow and down, then control passes directly to the End step 112 without selecting a new default adaptor. As a consequence of the test at step 118, a current "up" WAN link selected as the default network is not replaced as the default network when a new adaptor is bound to the computer PC2.

Returning to the top of the flowchart of FIG. 4, the steps are summarized for re-configuring the computer PC2 in response to an adaptor being unbound from the system. In response to the physical removal of a network adaptor or a request by a user to the operating system to unbind an adaptor, the operating system informs NWLINK 14 that an adaptor has been physically removed, or a user has requested unbinding of an attached adaptor.

If at step 102, the operating system indicates to NWLINK 14 that an adaptor is to be unbound, then control passes to step 130. At step 130 if the value stored in the Bound Adaptors Counter 32 equals two (i.e. the computer PC2 will no longer have at least two bound adaptors when unbinding of an adaptor is complete), then control passes to step 132.

At step 132, since the computer PC2 will no longer have a sufficient number of bound adaptors to facilitate routing, the NWLINK 14 discontinues the maintenance of the RIP table 36 through the reading of RIP information propagated through the attached networks. Control then passes to step 134 wherein in the value of the Bound Adaptors counter is decremented to reflect the unbinding from the computer PC2 of one of bound adaptors.

If at step 130, the value of the Bound Adaptors Counter is three or more, then the computer PC2 is still capable of routing data packets and therefore the computer PC2 continues to maintain the RIP table 36. If the Adaptor count equals one, then the RIP table building process was not activated, and therefore there is no need to discontinue the building of the RIP table 36 when an adaptor is detached from the computer PC2. Therefore, if at step 130, the value of the Bound Adaptors Counter 32 does not equal two, then control passes directly to step 134.

After decrementing the value of the Bound Adaptors Counter 32, control passes to step 136, and the NWLINK 14 closes the driver corresponding to the unbound adaptor. The operating system may then remove the adaptor driver if the driver is no longer being used by any other routers. In addition, at step 136 the NWLINK 14 updates the Bound Adaptors Table 30 by removing the entry corresponding to the unbound adaptor. If removing the entry causes a gap in the table entries, then the last entry in the table is moved into the open slot in the Bound Adaptors Table 30. Control then passes to step 138.

If at step 138, it is determined that the unbound adaptor equals the default adaptor (by determining the adaptor entry of the Bound Adaptors Table 30 referenced by the Default Adaptor variable 34), then control passes to step 140 where the NWLINK 14 selects a new default adaptor. The steps for selecting a default adaptor, summarized in FIG. 5, are described below. Control then passes to the End step 112. If however, at step 138, the unbound adaptor is not the default adaptor, then control passes directly to the End step 112.

Turning now to FIG. 5, the steps for selecting a default adaptor are summarized. Control passes from a Begin step 150 to step 152 where a Temporary variable is assigned the reference value stored in the Default Adaptor variable 34. Control then passes to step 154, and a loop counter "i" is set to zero. The default adaptor selection loop is then entered bypassing to step 156.

At step 156 an initial boundary test is made to determine whether all of the bound adaptors have been considered in selecting a default adaptor. If "i" is less than the value of the Bound Adaptors Counter 32, then control passes to step 158 wherein the NWLINK 14 determines whether the entry at position "i" in the Bound Adaptors Table 30 is a LAN adaptor. The purpose of the default adaptor selection loop is to find a first listed LAN adaptor in the Bound Adaptors Table 30. Therefore, if the entry "i" of the Bound Adaptors Table 30 corresponds to a LAN adaptor, then control passes from step 158 to step 160 wherein the Temporary adaptor variable is modified so that it contains a reference to the adaptor entry at position "i" of the Bound Adaptors Table 30. Control then passes to step 164.

If at step 158, the bound adaptor identified in position "i" of the Bound Adaptors Table 30 is not a LAN adaptor, then control passes to step 162 wherein the loop counter "i" is incremented and control passes to step 156. If no LAN adaptor is bound to the computer PC2, then the loop counter "i" will eventually equal the value in the Bound Adaptors Counter 32 and control passes from step 156 to step 164.

At step 164, if the Temporary adaptor variable does not equal the current reference value stored in the Default Adaptor variable 34, then control passes to step 166. At step 166, the value in the Default Adaptor variable 34 is modified in order to reference the Bound Adaptors Table 30 entry corresponding to the new default adaptor identified by the Temporary adaptor variable. In addition, the information in the RIP tables is purged so that any potentially conflicting Net IDs learned from the former default LAN will not cause transmitted packets to be mis-directed prior to when the RIP tables stabilize with new data learned using the new default network adaptor. Also, NWREDIR 10, NWSERVER 12 and any other IPX client applications 11 which require knowledge of the current state of the network connections are informed of the new default network number. Control then passes to a Return step 168.

If at step 164, the default adaptor did not change when the set of bound adaptors was modified (an adaptor was either bound or unbound), then there is no need to update the state of the computer PC2 in accordance with a new designated default adaptor (network). Therefore control passes directly to the Return step 168.

Figure 6:
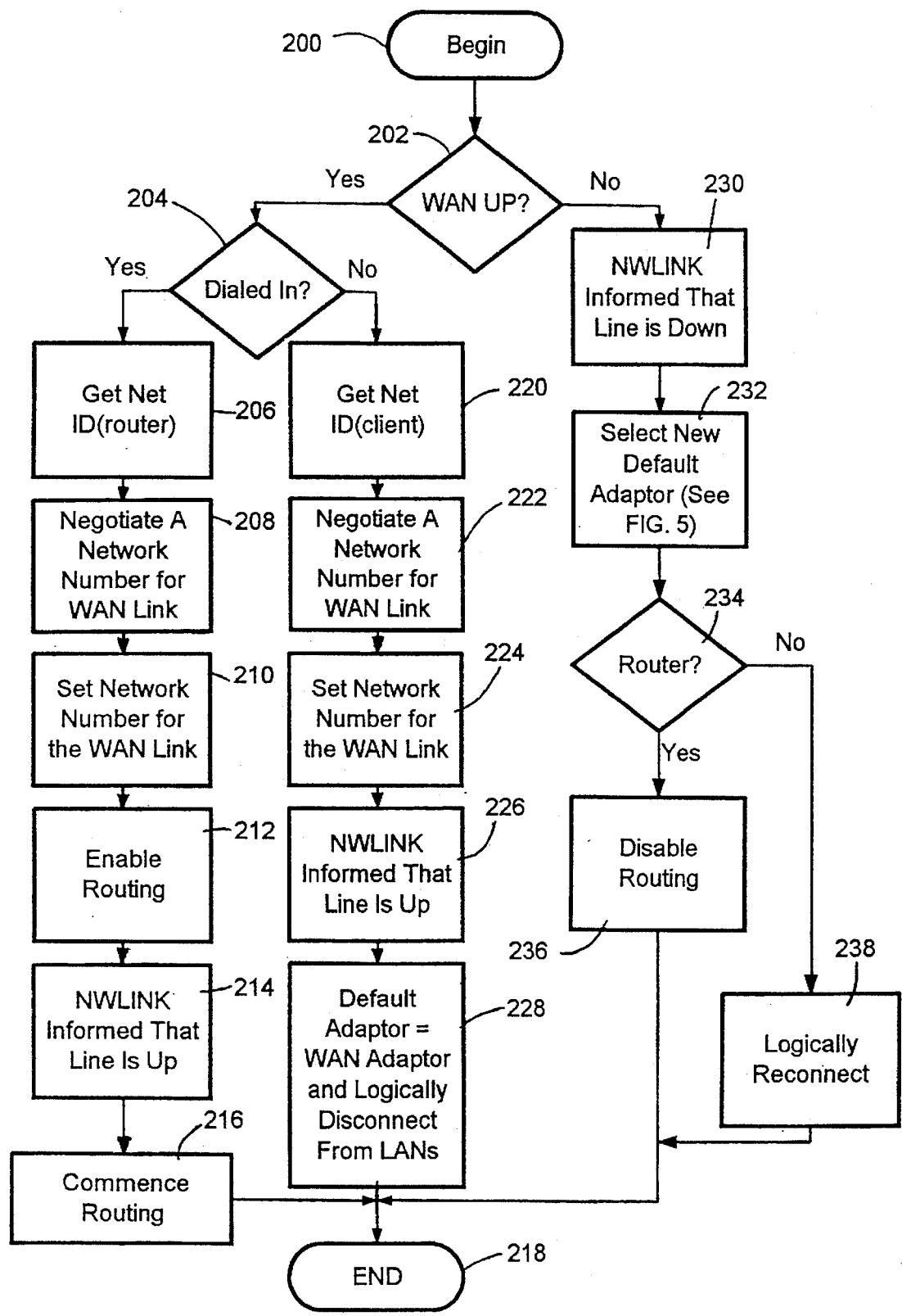
FIG. 6 is a flowchart summarizing the steps for reconfiguring a networked computer when a WAN link associated with a bound WAN adaptor goes up or comes down.

A change in the operation state (up/down) of a WAN link supported by a bound adaptor on the computer PC2 is another significant event in the operation of the computer PC2 which calls for a re-configuration of the computer PC2. Turning now to FIG. 6, control passes from Begin step 200 to step 202 when a change to the status of a WAN link is sensed by the dial up controller 22 of the computer PC2. As previously mentioned, the dial up controller 22 informs the NWREDIR 10 when the computer PC2 is currently operating in a client mode on the WAN (i.e. it has dialed out, or had previously dialed out to activate the WAN link). The dial up controller 22 informs the NWREDIR 10 to clear is state information relating to any of the existing connections. Next, if at step 202, the WAN link 202 is up (i.e. the link has been activated), then control passes to step 204.

At step 204, the dial up controller 22 determines whether the modem 28 received a call to activate the WAN link. If the modem 28 received a call from, for example, computer PC5, then control passes to step 206. At step 206, the WAN adaptor 20 calls the Get Net ID (router) procedure provided by the NWLINK 14. The Get Net ID (router) procedure returns a unique network ID which is to be assigned to the WAN adaptor in order to identify the source or destination of packets routed on the WAN link. Control then passes to step 208.

At step 208, the NWLINK 14 negotiates a final network number with the calling (client) computer system through the exchange between the computers of proposed network numbers. In the event that the network numbers provided by the routing computer PC2 and the client computer PC5 do not match, the final network number for the link is the highest proposed network number that is different from the networks presently connected to the routing computer PC2 and the client computer PC5. As will be explained further below, a client computer, in accordance with the illustrative embodiment of the present invention, logically disconnects from all other networks while communicating with the routing computer over the WAN link. Therefore, there is no risk that a network number submitted by the router computer PC2 will conflict with a network number known by the client computer PC5 embodying the illustrative embodiment of the present invention.

After a network number for the WAN link between computer PC2 and computer PC5 is negotiated in step 208, control passes to step 210. At step 210 the WAN Adaptor 20 calls the Set Met ID procedure wherein the Bound Adaptors Table 30 entry of NWLINK 14 corresponding to the WAN Adaptor 20 is updated to include the negotiated network number obtained during step 208. Control then passes to step 212.

At step 212, the NWLINK 14 activates processes known to those of ordinary skill in the art which enable the computer PC2 to carry out routing functions. The routing capability includes the ability to route packets between the WAN adaptor 20 and the bound LAN adaptors 16 and 18. The routing capability of the computer PC2 may also include the capability to route packets between the bound LAN adaptors 16 and 18 under certain limited situations where a central authority manages the network IDs associated with all connected LANS. Control then passes to step 214.

At step 214, NWLINK 14 is informed by the WAN adaptor 20 that the WAN link between the routing computer PC2 and the client computer PC5 is up. Control passes to step 216 wherein NWLINK 14 commences routing. At this point, the computer PC2 possesses the functionality of an IPX router capable of routing packets at least between a bound LAN adaptor such as LAN adaptors 16 and 18 and the WAN adaptor 20. Control then passes to an End step 218.

If however at step 204 the dial up controller 22 indicates that the modem 28 dialed out to another computer such as computer PC5, then, in accordance with the illustrative embodiment of the present invention, the steps 220 through 228 will be performed for configuring the computer PC2 to be a client computer.

At step 220, the WAN adaptor 20 calls the Get Net ID (client) procedure provided by the NWLINK 14. The Get Net ID (client) procedure returns a current network ID number retrieved from the entry in the Bound Adaptors Table 30 corresponding to the WAN adaptor 20. In most cases, the network number assigned to the WAN link does not matter to the computer PC2 when acting as a client. Therefore, by default, the number returned in response to the Get Net ID (client) procedure call is zero until the client ID is set using the Set Net ID function (described above). By convention, the highest number submitted by the WAN client and router is selected for the WAN link network number. Therefore, submitting a zero net number by the computer PC2, when acting as a client effectively allows the computer PC5, acting as the router, to select the net number. Under other circumstances, such as the negotiation of a network number with a router using a different network number selection protocol, values other than zero may be submitted in response to the Get Net ID (client) procedure call. Control passes to step 222.

At step 222, the computer PC2, in this case acting as a WAN client, negotiates a network number for the WAN link with the computer PC5 which is acting a routing computer. The negotiating procedure is accomplished in substantially the same manner described in conjunction with step 208. Only the roles of the computer PC2 and the computer PC5 have been switched. Control then passes to step 224 and the WAN Adaptor 20 calls the Set Net ID procedure wherein the Bound Adaptors Table entry of NWLINK 14 corresponding to the WAN Adaptor 20 is updated to include the negotiated network number obtained during step 222. Control then passes to step 226.

At step 226, NWLINK 14 is informed by WAN adaptor 20 that the WAN link between the client computer PC2 and the routing computer PC5 is up. Control next passes to step 228 wherein the Default Adaptor variable 34 is set to reference the entry of the Bound Adaptors Table 30 corresponding to the WAN link. All operating system components which utilize the NWLINK 14 are informed of the new default adaptor. Therefore, all packets received by the NWLINK 14 addressed to the zero (0) network are directed to the WAN adaptor 20.

Furthermore, in accordance with the illustrative embodiment of the present invention, the computer PC2 is logically disconnected from the LAN Adaptors 16 and 18 and therefore cannot receive packets from those adaptors. In order to logically disconnect from the LAN adaptors, all of the operating system components clear all specific state information they may have accumulated with respect to any of the LAN adaptors. In addition the RIP Tables are purged of all information supplied by the disconnected network(s), and a valid flag is set in each Bound Adaptor Table 30 entry corresponding to a logically disconnected adaptor so that the computer PC2 will ignore packets received from the logically disconnected adaptors.

In accordance with the illustrative embodiment of the present invention, there is only a single WAN adaptor. Therefore, there is no need to logically disconnect from other WAN adaptors. At this point, the computer PC2 is an isolated IPX client on the WAN link between the PC2 and the PC5. Control then passes to an End step 218 wherein the dial up controller 22 informs the NWREDIR 22 that the transformation of the logical network connections is complete.

Having discussed the modifications to the configuration of the computer PC2 when the WAN link comes up, attention is now directed to the steps performed by a computer PC2 embodying the present invention when a WAN link is disconnected (goes down). If at step 202, the dial up controller senses that the WAN link has gone down, then control passes to step 230. At step 230 NWLINK 14 is informed by the dial up controller that the WAN link between the computer PC2 and the computer PC5 is down. Control passes to step 232.

At step 232, the NWLINK 14 attempts to set the Default Adaptor variable 34 to reference an entry in the Bound Adaptors Table 30 corresponding to a bound LAN adaptor in accordance with the steps summarized in FIG. 5. If a computer does not have a bound LAN adaptor, then the default adaptor continues to be the down WAN Adaptor.

Continuing with the description of FIG. 6, and in particular step 234, the NWLINK 14 next determines whether the computer PC2 was acting as a router when the WAN link to the computer PC5 went down. If the computer PC2 was a router, then control passes to step 236 and the NWLINK 14 discontinues the providing of routing services between the bound adaptors. Control then passes to the End step 218 wherein the dial up controller informs the NWREDIR 22 when the transformation of the logical network connections is complete.

If the computer PC2 was not configured as a router on the WAN link, then control passes to step 238 where the NWLINK 14 logically re-connects to the adaptors represented in the Bound Adaptors Table 30 by re-setting the valid flags associated with the adaptors. Thereafter, control passes to the End step 218.

Though the PC2 could theoretically be instructed to continue to route messages between the two bound LAN Adaptors 16 and 18 when the WAN link goes down, this capability is not implemented in the illustrative embodiment. Such a capability is reserved in the illustrative embodiment of the invention for the static router SR1.

Having described the illustrative embodiment of the present invention, it is noted that a number of alterations to the illustrative embodiment which fall within the contemplated scope of the present invention. The interconnected network environment depicted in FIG. 1 is merely illustrative. A computer system embodying the present invention includes the capability to bind at least one WAN adaptor and one LAN adaptor. However, additional LAN adaptors or WAN adaptors may also be bound to a computer incorporating and practicing the present invention. The type of WAN link, while typically a modem and phone line, may be any WAN link including RF and ISDN links. Modifications to the illustrative network falling within the scope of the appended claims would be known to those of skilled in the area of networked computer systems.

Furthermore, the illustrative embodiment utilizes the well known IPX protocol to perform routing between networks, however, the present invention is applicable to other protocols for transmitting packets between connected networks.

Also, while a plug and play system and method for binding an adaptor has been described, the present invention is not intended to be limited to systems incorporating plug and play capabilities. Instead, the present invention may be incorporated in systems requiring various levels of user intervention in order to bind an adaptor to a computer.

Finally, the illustrative embodiment of the present invention embodies a specific set of rules for implementing dynamic re-configuration of a networked computer in response to certain changes in the number of bound adaptors and the state of a WAN link associated with a bound WAN adaptor. However, alterations to these rules may fall within the spirit and scope of the present invention defined by the claims appended below.

What is claimed is:

1. A method for dynamically configuring a networked computer supporting connections to a plurality of networks including at least one local area network (LAN) connection and a wide area network (WAN) connection, the method for dynamically configuring the networked computer comprising the steps of:

detecting, by the networked computer, an up WAN link to a remote networked computer;

determining an initiator of the up WAN link; and configuring, by the networked computer, a set of network components of the networked computer, said configuring step comprising:

disconnecting existing logical network connections between the networked computer and all physically coupled networks except a network associated with the up WAN link in response to a determination, during the determining an initiator step, that the networked computer initiated the up WAN link; and enabling routing of packets, by the networked computer, between at least the WAN link and a second connected network in response to a determination, during the determining an initiator step, that the remote networked computer initiated the up WAN link.

2. The method of claim 1 wherein the second connected network comprises a LAN.

3. The method of claim 1 wherein the networked computer comprises two or more bound LAN adaptors after the networked computer performs the enabling routing step, and wherein the enabling routing of packets includes enabling routing between two (2) LANs.

4. The method of claim 1 further comprising the steps of:

detecting deactivation of an up WAN link from a remote networked computer resulting in a down WAN link, and in response to the detecting deactivation step discontinuing routing, by the networked computer, of packets between adaptors bound to the networked computer.

5. The method of claim 4 wherein two or more LAN adaptors are bound to the networked computer when the networked computer performs the discontinuing routing step.

6. The method of claim 1 further comprising the step of:

commencing gathering, by the networked computer, of RIP information after binding of a network adaptor results in two (2) adaptors being bound to the networked computer.

7. The method of claim 6 further comprising the step of:

discontinuing gathering, by the networked computer, of RIP information after unbinding of a network adaptor results in one (1) adaptor being bound to the networked computer.

8. The method of claim 1 wherein the networked computer incorporates the IPX protocol.

9. The method of claim 1 wherein the networked computer comprises two or more bound LAN adaptors, the method further comprising the step of assigning, by the networked computer, default status to an adaptor of the two or more adaptors.

10. The method of claim 1 wherein the networked computer comprises a bound WAN adaptor and at least one bound LAN adaptor, the method further comprises the steps of:

assigning default adaptor status to a bound LAN adaptor; and next assigning, by the networked computer, default adaptor status to the WAN adaptor in accordance with the disconnecting step.

11. The method of claim 10 further comprising the steps of:

next detecting, by the networked computer, a down WAN link associated with the WAN adaptor having default adaptor status; and re-assigning default adaptor status from the WAN adaptor to a bound LAN adaptor in response to the next detecting step.

12. A networked computer for dynamically supporting connections to a plurality of networks including at least one local area network (LAN) connection and a wide area network (WAN) connection, the networked computer comprising:

a WAN adaptor connection controller for detecting an up WAN link to a remote networked computer;

means for determining an initiator of the up WAN link; and means for configuring a set of network components of the networked computer, the means for configuring comprising:

means for disconnecting existing logical network connections between the networked computer and all physically coupled networks except a network associated with the up WAN link in response to a determination that the networked computer initiated the up WAN link; and means for enabling routing of packets, by the networked computer, between at least the WAN link and a second connected network in response to a determination that the remote networked computer initiated the up WAN link.

* * * * *